United States Patent [19]

Scheibe et al.

[11] Patent Number: 5,892,437
[45] Date of Patent: Apr. 6, 1999

[54] ON-BOARD BRAKE WARNING DEVICE FOR AIR BRAKE EQUIPPED VEHICLES

[75] Inventors: Robert R. Scheibe, Redmond; Per G. Reinhall, Seattle, both of Wash.

[73] Assignee: University of Washington, Seattle, Wash.

[21] Appl. No.: 700,159

[22] Filed: Aug. 20, 1996

[51] Int. Cl.[6] ........................................................ B60Q 1/00
[52] U.S. Cl. ........................ 340/467; 340/438; 340/453; 73/129; 73/132; 701/70
[58] Field of Search ................................. 340/467, 453, 340/438, 439; 73/129, 132, 128; 364/426.01, 426.028, 426.029; 701/40, 44, 57, 59, 70, 71

[56] References Cited

U.S. PATENT DOCUMENTS

| | | | |
|---|---|---|---|
| 4,024,756 | 5/1977 | Cline | 73/132 |
| 4,487,060 | 12/1984 | Pomeroy | 73/129 |
| 4,520,663 | 6/1985 | Moore et al. | 73/121 |
| 4,538,228 | 8/1985 | Brearey et al. | 364/426 |
| 4,701,854 | 10/1987 | Matsuda | 364/421 |
| 4,886,141 | 12/1989 | Ikegami et al. | 180/233 |
| 5,171,069 | 12/1992 | Peck et al. | 303/129 |
| 5,299,452 | 4/1994 | Caron et al. | 73/129 |

OTHER PUBLICATIONS

Progress Report—IDEA Intelligent Vehicle—Highway Systems "Emerging Concepts and Products for Intelligent Transportation Systems" Sep. 1994.

*Primary Examiner*—Jeffery A. Hofsass
*Assistant Examiner*—Davetta Woods
*Attorney, Agent, or Firm*—Delbert J. Barnard

[57] ABSTRACT

A brake warning system for vehicles with pneumatic air brakes monitors various factors to provide an indication of a pending or actual brake failure condition. According to one embodiment, vehicle brakes are tested by determining a delay time between pressure changes in a control brake line from a treadle valve and the response of the brake. According to another embodiment, brake performance is measured by monitoring applied brake line pressure versus known brake performance values. Measurements are taken with the brakes in a known good condition, during a "training mode," and data is then compared, on a continuous basis, with data acquired by ongoing measurements. The invention provides an on-board, real-time, assessment of vehicle brake performance, through measurement of a relatively small number of parameters.

10 Claims, 4 Drawing Sheets

ON-BOARD BRAKE WARNING DEVICE FOR AIR BRAKE EQUIPPED VEHICLES

CROSS-REFERENCE TO RELATED APPLICATION

This application is a continuation-in-part application of provisional application Ser. No. 60/002,590, filed Aug. 21, 1995, entitled, "Brake Warning System."

FIELD OF THE INVENTION

This invention relates to measuring and testing of vehicle systems. More particularly, the invention relates to systems which measure different parameters in order to provide an indication of brake system conditions. The invention is preferably adaptable to pneumatic brake systems (air brakes) which are found on heavy trucks.

BACKGROUND OF THE INVENTION

The invention was originally designed for use with long haul-type trucks, which have a tractor and semi-trailer combination. By "semi-trailer" we refer to the type of trailer commonly found on combination trucks. The semi-trailer mounts on a fifth wheel of a tractor. In the case of "doubles" and "triples" (two or three trailers), the fifth wheel is part of a dolly which is attached to the back end of a leading trailer. For this reason, the second and subsequent trailers in such an assembled combination are not literally semi-trailers because the combination of a dolly and semi-trailer results in substantially the full load of the trailer being independently supported by the dolly and trailer wheels. For the purpose of this invention, such rigs are also considered to be semi-trailers and the dolly may or may not be equipped with brakes. In addition, other combinations are common, such as are found in articulated and non-articulated busses and other types of articulated combination trucks. In addition, the invention is not limited to the type of air brake system found on such long haul trucks, and, in fact, may be used to monitor a wide variety of braking systems.

Malfunctioning brakes are the leading mechanical cause of commercial vehicle accidents and constitute the most common safety violation. Air brakes are used on most tractors and trailers with gross vehicle weight ratings of over 19,000 lb. (8600 Kg), most single trucks over 31,000 lb. (14,000 Kg), most transit and inter-city buses, and about half of all school buses. Commercial vehicle safety and accident analysis reveals numerous reasons why air brakes are such a problem; these reasons fall primarily into two categories related to the design characteristics of air brake systems. First, air brake systems are more sensitive to adjustment condition than hydraulic brakes. Second, air brakes provide less tactile warning of brake degradation to the driver than hydraulic brakes. Because accidents involving heavy trucks and buses have the potential to be severe, a means for detecting such problems is needed. Surprisingly, no commonly available brake warning systems are available that can warn drivers about a loss of brake effectiveness due to mechanical causes other than low supply pressure.

Data collected by the National Highway Traffic Safety Administration (NHTSA) from 1988 to 1990 show that whereas only 1 percent of registered vehicles are commercial vehicles, they represent 5 percent of total vehicle miles traveled. Furthermore, accidents involving commercial vehicles are estimated to account for approximately 10 percent of fatalities. Data from the Fatal Accident Reporting System, collected by NHTSA, from 1982 to 1990 show that of the 50,000 fatal accidents involving heavy trucks during that period, only 8400 (17 percent) of the fatalities were heavy truck occupants. The overwhelming majority (69 percent) of fatal injuries were caused to automobile or light truck occupants. Further studies have estimated that 40 percent of all trucks will be involved in a brake related crash during the lifetime of the truck and that in 33 percent of all truck accidents, a brake system problem is a contributing factor. These statistics underscore the importance to the general public of improved commercial vehicle safety.

The only existing means of determining brake condition is to measure brake chamber adjustment (stroke) on a stationary vehicle, which requires a wheel by wheel inspection by trained personnel. Chamber manufacturers provide specifications for acceptable stroke levels for various chamber sizes. Commercial vehicle enforcement officials nationwide use the Commercial Vehicle Safety Alliance North American Uniform Inspection and Out-of-Service Criteria for determining when to declare vehicles out-of-service (OOS) and hence inoperable. The Commercial Vehicle Alliance guidelines state that a vehicle must be put OOS if at least 20 percent of the vehicle's brakes are defective. One defective brake is defined as either one brake one-quarter inch or more beyond the readjustment point or two brakes less than one-quarter inch beyond the readjustment point. The vehicle must also be declared OOS if a steering axle brake is one-quarter inch or more beyond the adjustment limit, or if brake adjustment on two sides of a steering axle differ by one-half inch or more (because of concerns about steering wheel pull).

Commercial vehicle air brakes pose a significant safety concern on today's roadways for a number of technical reasons. Ninety percent of heavy truck and bus air brakes currently consist of drum type S-cam foundation brakes, with diaphragm chambers and manual or automatic slack adjusters. The diaphragm-type brake is very sensitive to adjustment condition; chamber pressure versus force characteristics are nonlinear, and there is a sudden drop-off in force when the pushrod stroke exceeds the recommended level. Chamber pushrod stroke increases as the brake shoes wear, or as the drums expand at higher temperatures. But when the recommended adjustment level is exceeded, the diaphragm diminishes in effective area as stroke increases, which, along with other kinematic and design-related factors, causes the braking force for a given pressure level to diminish sharply. When pushrod stroke becomes so great that the pushrod bottoms out in the chamber, brake force drops to zero.

In hydraulic brake systems, application of the brake pedal acts to pressurize a fluid so that the motion of the pedal displaces a fixed volume, and pedal height is proportional to brake adjustment. In contrast, application of an air brake pedal (treadle valve) simply opens a metering valve to divert compressed air from the storage tank(s) to the brake chambers. Hence, only a slight increase in brake pedal travel achieves greater delivered pressure.

The sensitivity of air brake systems to adjustment is compounded by a lack of feedback to the driver. Because air brake pedal height does not change appreciably with the amount of air used, the driver is insulated from direct energy input to the brakes, and as braking efficiency diminishes (through loss of adjustment, thermal loads, or other factors), very little tactile sensation is transmitted through the treadle valve. In other words, the brake pedal does not necessarily feel "spongy" or low, as in a typical automobile. The only real feedback a driver receives is the sensation of deceleration for a perceived pedal application position. The relatively large mass and low deceleration rates of commercial vehicles exacerbate the difficulty in perceiving brake degradation.

Adjustment sensitivity is further compounded by an increase in the time necessary for all the brakes to reach full operating pressure. As pushrod stroke increases, not only does the force level drop, but the brakes take longer to reach the desired application pressure (air transmission lag time). For properly adjusted brakes, it can take over half a second for adequate air pressure to reach the farthest axle of a triple trailer combination; this can add significantly to stopping distance. Tests have shown that application times can increase by about 80 percent when strokes go from the fully adjusted condition to the legal limit.

Because of the compounding effects of brake fade and drum expansion, hot brakes experience a significant reduction in braking performance. If only some of the brakes are properly adjusted, then those in adjustment will take a disproportionate share of the load, and may fade prematurely, shifting the load to the other (poorly adjusted) brakes. One study showed that for a fully adjusted brake operating at 600° F. (355° C.), the available brake torque is 85 percent of maximum, and it drops to only 50 percent of maximum when the stroke reaches the upper adjustment limit.

An additional factor complicates the understanding of brake performance as measured by pushrod stroke on a stationary vehicle. Pushrod stroke (at a given pressure) has been found to increase beyond the statically determined value when the vehicle is in motion. This phenomenon, called dynamic stroke increase, is believed to be caused by self-energization of the brake mechanism and elastic deformation of the foundation brake components. The dynamic stroke increase has been reported to be approximately 0.1 in. (0.25 cm) at 85 psi (60 N/cm$^2$).

It was noted that there are several characteristics of braking a vehicle with an air brake system. One is that of the nature of deceleration. As with any friction brakes, deceleration is proportional to braking force applied divided by the mass (weight) of the vehicle. It is anticipated that vehicle weight will be provided automatically for vehicles, but could be input manually. From Newton's Second Law, the deceleration should be:

$$decel = 1/m(F_b + F_d),$$

where:

$F_b$=braking force $F_d$=drag force

M=vehicle mass

The braking force ($F_b$) for each brake reduces to:

$$(F_b) = c_0 + c_1(temp) + c_2(stroke) + c_3(speed) + c_4(pressure))$$

SUMMARY OF THE INVENTION

In accordance with the present invention, a brake warning system is provided for use on a combination vehicle, in which various factors are monitored in order to provide an indication of defective brakes. In the preferred embodiment, the system is able to monitor the condition of brakes which use positive pneumatic pressure to apply braking force. The system is further able to compare measured values with predetermined parameters, and thereby provide an indication and/or warning of a deviation in brake performance.

According to one preferred embodiment of the invention, vehicle brakes are tested by determining the lag time of application between pressurizing a control brake line by means of a treadle valve and the response of the brake. In accordance with a modification of that embodiment, measurement can also be made of the lag time for brake pressure decrease, which results from the release of the treadle valve and consequential disengagement of the brakes. Either lag time yields an indication of changes in the brake adjustment, i.e., the length of travel in the brake actuator.

If the brakes go beyond adjustment or wear limits, the lag time increases, thereby providing an indication of a possible defective brake condition. Such a test sequence can be automatically or manually cycled with the vehicle stationary, or the measurements can be made automatically upon the engagement and/or disengagement of the brakes while the vehicle is operating on the road.

According to another preferred embodiment of the invention, brake performance is measured by monitoring factors including brake line pressure, vehicle weight, and speed, and actual deceleration during a braking maneuver and comparing the collected data with calculated deceleration values for cool, properly maintained brakes by using the same values for the factors.

According to a modification of the invention, sensed data relating to engine braking are provided in order that brake performance measurements can be made either by selectively disregarding measurements taken during engine braking or by taking such engine braking into account when providing brake performance data.

According to a further aspect of the invention, brake condition is determined by taking measurements of parameters such as deceleration, speed, pressure, weight and response times. Such measurements are taken with the brakes in a cool and properly maintained condition, during a "training mode." These data are used in conjunction with a mathematical algorithm to create a model of proper performance, which is then compared, on a continuous basis, with data acquired by ongoing measurements. When the brake performance deteriorates beyond a threshold established by the algorithm during the "training mode," a warning or other indication of brake condition is presented.

According to a further aspect of the invention, a brake warning device receives a plurality of inputs and compares the inputs to manually or automatically inserted data. The data are compared with ongoing received data, which are then evaluated and, if the data indicate that brake performance is significantly diminished or may become so if operation is continued, then an appropriate warning or indication of such problem is provided.

In accordance with one embodiment of the invention, ongoing data are evaluated by providing a weighted average of samples. In that way, average data values are used to provide a warning. These data may optionally be supplemented by providing additional warnings when a single sampling of the data indicate one of several predetermined forms of seriously diminished braking effectiveness.

According to a preferred embodiment, at least some of the following sensor and information inputs are used to generate a dynamic braking profile for a vehicle:

deceleration;

application pressure;

response pressures;

vehicle speed;

weight;

brake stroke;

brake temperature;

date; and time.

One embodiment of the invention incorporates three modes: static, training, and operational. The static mode involves determination of brake lag or determination of brake pressure decay. These determinations are obtained in response to a predetermined event. Brake lag and brake decay are delays between application or release of control pressure and a measured response of the brakes. Brake lag and brake decay will collectively be referred to as brake response delay.

The predetermined event is preferably soon after vehicle start-up or at other times, if so desired. The predetermined event can be a derived from various functions, such as startup, time and other events which occur with the vehicle stationary.

A baseline lag or decay time will preferably be "learned" by the system through a training session on a stationary vehicle with cool and properly adjusted brakes. Depending on the vehicle, varying numbers of axles will be checked for lag. Advantageously, the preferred values for lag or decay need not be known prior to operating the system because these values are determined when the brakes on a given axle group are in known good condition.

The inventive brake monitor system will be "taught" a baseline condition of brake lag for the vehicle. An electropneumatic valve will be activated to automatically apply the brakes with a predetermined pressure in response to the predetermined event. In that way, brake applications will be regular and predictable so lag can be measured consistently. After each application of the brakes, actual readings will be compared with the value corresponding to the baseline condition, which was learned from training. If lag or decay exceeds the threshold by a predetermined amount, a warning will be issued.

Once the brake monitor system has sensed that the vehicle is in motion, system memory is interrogated to determine whether a current training file is available that contains the deceleration and brake response delay model parameters. If the current training parameters are available, the system will immediately enter the operational mode; otherwise, it will enter the training mode. There will also be a switch accessible only to service technicians that can set the system in the training mode after significant brake service.

In one variant of the invention, the training mode is initiated after brake condition has been verified. During the training mode, the vehicle is driven at a variety of speeds and brakes are applied for several seconds at a variety of braking pressures above a predetermined minimum pressure.

As soon as data from a predetermined number of cycles have been collected, the collected data are analyzed to generate a profile of acceptable brake performance for that truck. The data are written to a file, and regression models of deceleration and response delay are created. Regression parameters, representing the optimum braking conditions, will be stored in non-volatile memory for comparison with operational runs. At this point, the system is switched into an operational mode.

Once in the operational mode, the collection of data will be identical to that of the training mode. Data from each suitable braking cycle will be compared with a prediction from the model. A two-tiered threshold of warning will be instituted. If the measured data point deviates from the model by an amount greater than an "upper threshold," a warning will be issued immediately; if not, deviation from the model for that data point will be stored in memory. A running average of deviations from recent runs will be retained. If that average exceeds a "lower threshold," a warning will be issued. In any case, a performance history, much like a flight data recorder, will be kept in memory and available for download.

Warning of degraded brakes or impending brake failure will hence be obtained through several possible channels. In the preferred embodiment, a warning will be issued if:

brake lag is excessive, indicating excessive stroke;

brake decay is excessive, indicating excessive stroke;

measured values of deceleration for a single braking cycle are beyond a predetermined threshold of acceptable deviation for a single braking action from the model; or the composite average of deceleration and response delay for the current braking cycle and a predetermined number of previous cycles are beyond a weighted threshold of acceptable deviation from the model.

In the preferred embodiment of the invention, the brake monitoring system consists of an on-board microprocessor that monitors brake air pressures, vehicle weight, speed, deceleration, and roadway environment information such as grade severity. Through an empirically determined algorithm, the monitoring system warns the driver of impending loss of brake effectiveness (or provides information to maintenance personnel or authorities) without having to monitor individual brake strokes, temperatures, or mechanical deficiencies. The monitoring system is passive so that the driver will not have to calibrate the device or enter any information related to the vehicle, road, or load. Because the monitoring system assesses braking performance from the standpoint of the total vehicle system, it is sensitive to brake degradation from any cause. In its simplest form, the monitoring system requires only a few sensors and systems not already carried on a modern vehicle. The concept incorporates data communication systems that allows information flow to and from the vehicle. The monitoring system is adaptable to existing vehicles and complementary to other on-board safety systems and diagnostics, including anti-lock brake systems (ABS). Although ABS functions to prevent brake lock-up, it does nothing to assure that there is adequate braking power; as such, the monitoring system provides a complementary "front end" to ABS.

The monitoring system operates in two modes, the first to "train" the algorithm and the second for continuous safety monitoring. In the first mode, the monitoring system algorithm creates a model of "ideal" brake performance; to create this ideal, a well-maintained vehicle is driven for a short time with brakes that are cool and properly adjusted. During the second mode, for normal operation, the monitoring system continuously monitors performance parameters and makes real-time comparisons with the "ideal" brake performance model that was created during training. The algorithm determines whether measured conditions violate predetermined rules for the absolute threshold of safety, or whether predictive guidelines indicate that data are displaying an unfavorable trend. An audible or visual go/no-go warning is issued to the driver at the first instant of actual or predicted brake degradation beyond an established threshold. Results of this multi-dimensional analysis are also stored and can made available to vehicle maintenance personnel or authorities through Intelligent Transportation System (ITS) communications.

BRIEF DESCRIPTION OF THE DRAWINGS

Like reference numerals are used to indicate like parts throughout the various figures of the drawing, wherein.

BEST MODE FOR CARRYING OUT THE INVENTION

Figure 1:
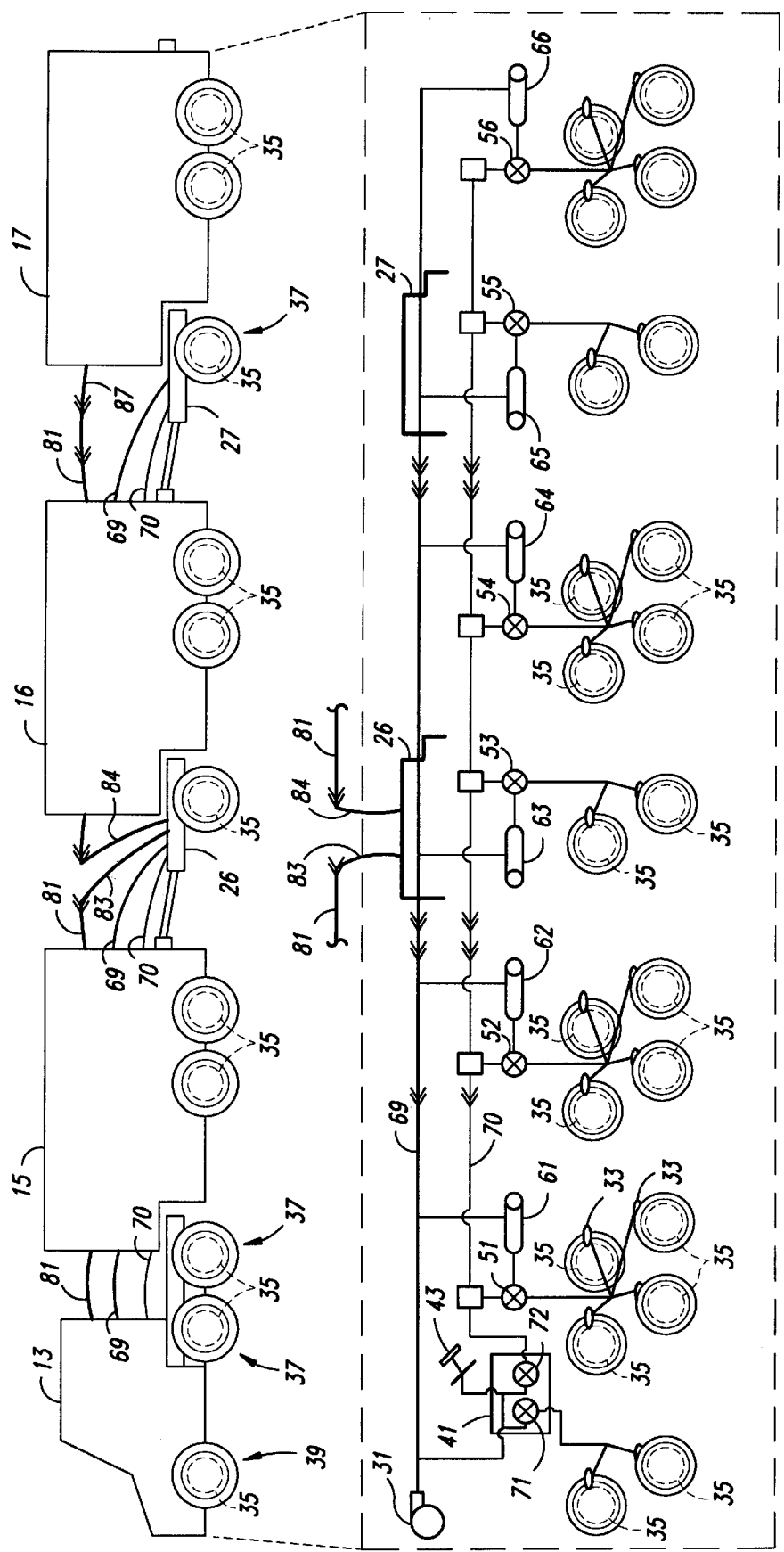
FIG. 1 is a schematic diagram showing the use of sensors on a combination truck.

FIG. 1 shows an arrangement on a combination truck-trailer vehicle. The combination truck includes a truck-tractor 13 and one or more trailers or semi-trailers 15–17. The first semi-trailer 15 rides on a fifth wheel (not shown) of the tractor 13. Subsequent trailers 16, 17 can have the same structural configuration as the first trailer 15, but ride on dollies 26, 27. The dollies 26, 27 allow the vertical load of the second and third trailers 16, 17 to rest on the respective dolly and trailer combinations 16, 26 or 17, 27. For this reason, the second and subsequent trailers 16, 17 are, in effect, full trailers when resting on their dollies 26, 27. While this is the most common configuration for multiple trailer trucks, other combinations are possible and the present invention is intended to function with such other combinations.

In a pneumatic air brake system, compressed air (compressor 31) supplies air to brake actuators 33*a*–33*p*, which activate brakes 35 located on each wheel 37. Except for the truck's steering wheels 39, the brakes 35 are generally S-cam operated drum brakes, wherein the actuator 33 operates a lever (not shown), which, in turn, rotates the S-cam (not shown). The system is well known in the art and the present invention is intended to work within the existing system.

In order to actuate the brakes 35, air is admitted through a treadle valve 41, which is controlled by brake pedal 43. Rather than provide enough air to actuate all of the brakes 35 through lines starting with the treadle valve 41, in response to operation of the treadle valve, a system of relays 51–56 are used. The relays 51–56 are supplied with compressed air, also from compressor 31, to a separate air line 69, which is maintained at brake line pressure. The separate air line 69 supplies brake reservoir tanks, such as tanks 61–66, associated with each axle group. At least one reservoir, such as reservoirs 61–66, are provided for each axle group.

This allows a pneumatic brake control line 70, supplied through the treadle valve 41, to control actuation of all the brakes 35 behind the steering wheels 39, without the necessity that all actuation air is supplied through the treadle valve 41 and control line 70 to those brakes. In the example shown, twenty brakes 35 behind the steering wheels 39 must be actuated. Air from the pneumatic control line operates the relays 51–56, which, in turn, opens air from the brake supply line 69 to the actuators 33. Reservoirs, such as reservoirs 61–66, provide an immediate air supply to each relay 51–56, so that delay in actuating the brakes 35 is minimized.

The treadle valve 41 is shown as having two separate valve units 71, 72. That is because in many trucks, the braking of the steering wheels 39 is handled separately. The steering wheels 39 may be either directly operated with air supplied through the treadle valve 41 or through a relay (not shown).

In addition to the brake lines, each part of the combination truck is provided with an electrical connection 81. In the prior art, the electrical connection is typically accomplished with a 7-pin connector. This provides ground, running lights, clearance lights, left and right turn signals, brake lights, left and right brake lights (for older vehicles that use the brake lights as turn signals), and power for cabin lighting and the like. The electrical connection 81 is supplied from the tractor 13 to each trailer 15–17. The dollies 26, 27 also have connections for the electrical connection 81, as shown at 83, 84, although this connection is often bypassed and the connection is made from trailer to trailer, as shown between trailer 16 and 17 at 87.

Figure 2:
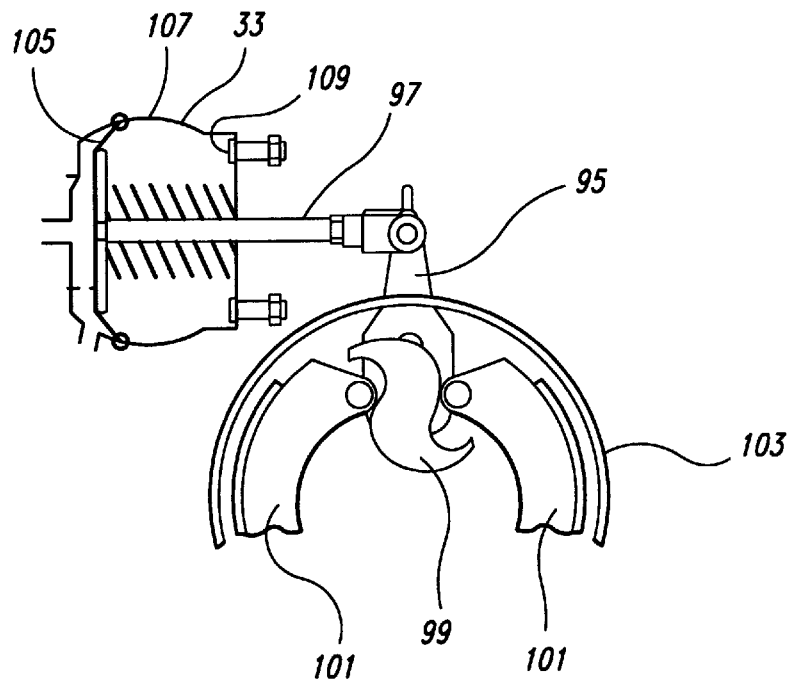
FIG. 2 shows a configuration for a pneumatic air brake which is S-cam operated.

FIG. 2 shows a typical brake arrangement. The actuator 33 is connected to a slack adjustor 95 by a pushrod 97. The slack adjustor 95 drives an S-cam 99, which, in turn, causes brake shoes 101 to expand against a brake drum 103. The actuator 33 consists of a diaphragm 105 which responds to brake line pressure to move within an outer chamber 107. Out-of-adjustment brakes occur when the diaphragm 105 extends in the chamber to the end closest to the slack adjustor 95. In an extreme case, the diaphragm 105 extends all the way to the end of the chamber 107 closest to the slack adjustor 95, thereby limiting further braking force. Other defects are possible, such as brake fade, worn brakes which are otherwise properly adjusted, broken components, brake contamination, and pneumatic leaks, such as leaks in the diaphragm 105.

Figure 3:
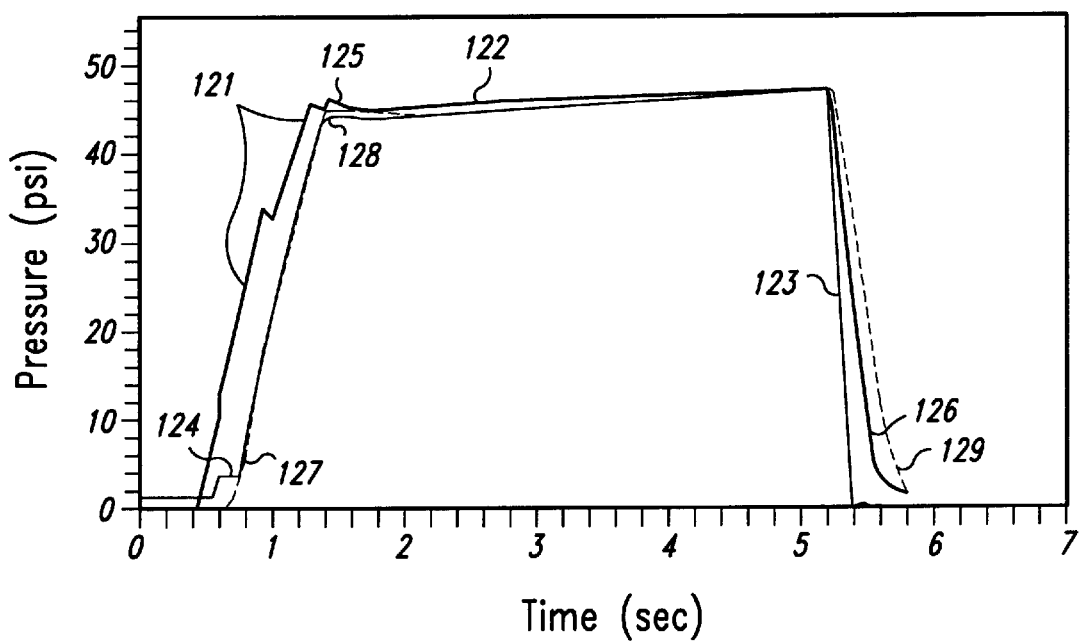
FIG. 3 graphically shows actuation pressure and brake application pressure for pneumatic brake lines, depicting brake lag and brake decay for a sample brake.

Referring to FIG. 3, brake lag and brake decay are depicted in a sample application cycle. Pneumatic pressure at the output of the treadle valve 41 (FIG. 1) is depicted in the solid lines 121–123. Response pressures at two of the major axle groups is shown by lines 124–126 and 127–129, respectively. These lines are given by way of example and may be at variance from actual test results. Typically, actuation pressure approximates response pressure, since a common pressure source (compressor 31) is used. It can be seen that, as application pressure is applied, at line 121, there is a time delay in the response of the major axle groups, depicted at 124 and 127. This delay in response is called "brake lag." When the response pressure reaches a steady state, at 125 and 128, the brakes 35 are believed to have been applied to the full extent demanded by the extent that the treadle valve 41 is opened. After the treadle valve is released, application pressure, at 123, drops off and allows pressure at the actuators to drop off, as shown at 126 and 129. The drop off of actuator pressure 126, 129 occurs at a later time because of the compressivity of air and the physical movement of the diaphragm 105 in each actuator 33 as the slack adjustor 95 and pushrod 97 return to a rest position. The time delay between drop off of application pressure 123 and actuator pressure 126, 129 is called the "decay time." Collectively, the brake lag and decay time can be referred to as brake response delay.

It turns out that brake lag is significantly affected by the truck driver. The rate at which application pressure 121 changes is controlled, in part, by the speed of operation of the brake pedal 43 and, consequently, the treadle valve 41. Brake decay time, on the other hand, is less affected, because it is possible to release the brake pedal 43 faster than the response time of the treadle valve 41. All of these variations can be overcome, however, because it is possible to cause the brakes to automatically apply application pressure to the brakes 35. Since automatic application by the brakes is accomplished by a machine, the rate of pressure increase and of pressure decrease is very repeatable.

It has been found that, as the brakes 35 reach a condition requiring service, both the lag time and decay time increase. Decay time may be a preferable measure of brake effectiveness because release of application pressure is generally considered to be a more repeatable event. There is a close relationship between changes in lag time and changes in decay time.

While the use of a dual pneumatic system using a treadle valve 41 and relays 51–56 is described, it is also possible to actuate pneumatic brakes electrically or by other means. In such case, an appropriate relay would be used in place of pneumatic relays 51–56. The operation of the relays 51–56 is accomplished by a brake control signal. The brake control signal may be pneumatic pressure from the treadle valve 41 or another signal such as an electrical signal.

Figure 4:
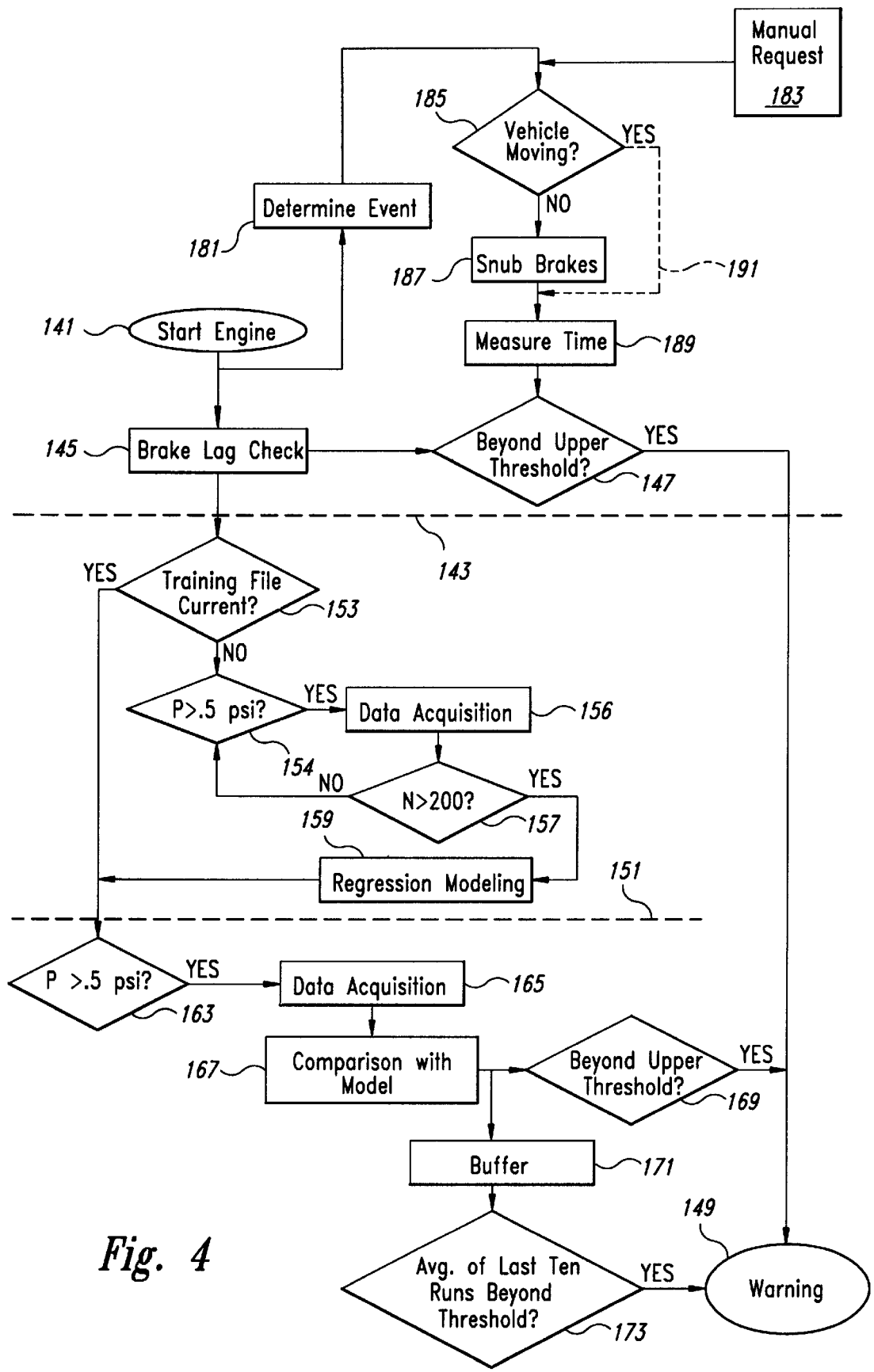
FIG. 4 is a logic diagram showing the generation of a brake warning in accordance with the present invention.
Figure 5:
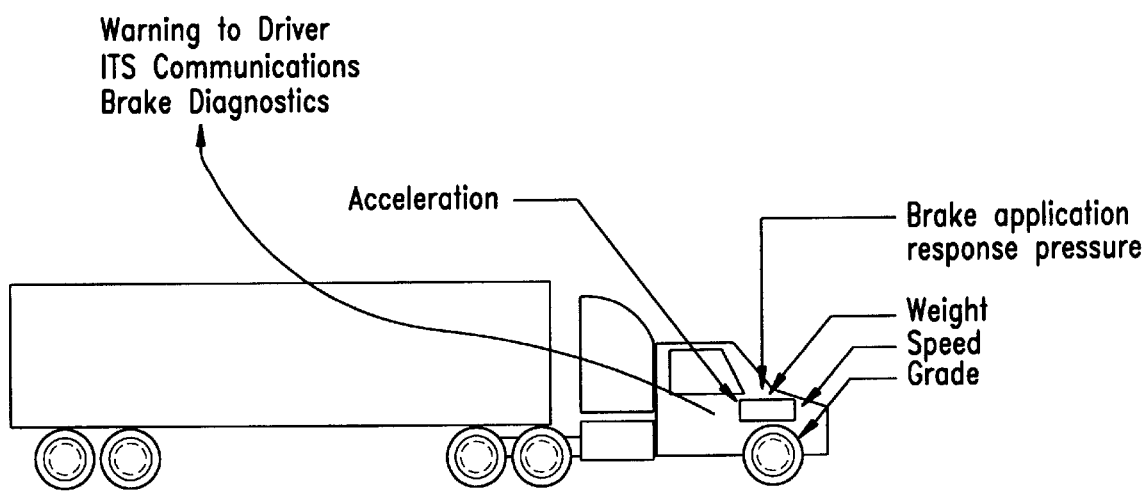
FIG. 5 figuratively represents status reporting as provided by the invention.

Referring to FIG. 4, a preferred testing sequence is shown. As with any method, variations can be made with the method in accordance with the preferences of those implementing the method. Upon starting of the truck's engine, represented by block 141, a static test is made, as indicated above dotted line 143. In the preferred embodiment, the static test consists of a brake lag check, represented by block 145. If the brake lag is beyond an optimum threshold, represented by block 147, a brake warning is issued. The brake warning is represented by block 149, and provides a status report as figuratively represented in FIG. 5. As mentioned before, the brake lag check can be accomplished by determining brake decay. In either case, the brake lag check consists of snubbing the brakes 35, either automatically, or by waiting for the driver to perform the function represented by block 187.

Snubbing of the brakes consists of actuating and then deactuating the brakes. This can be accomplished by pulsing air into the brake control line 70 and then releasing air in that line 70.

The dynamic mode of the test is shown below line 143. The dynamic training mode is shown between lines 143 and 151. The dynamic training mode consists of a determination that a training file is current, as indicated at decision block 153. If the training file is not current, a determination is made whether the braking pressure is above an "idle" or "no brakes" pressure, as indicated at block 154. This is determined by brake pressure of any line which is responsive to the treadle valve 41, including the control brake line 70 and the brake lines between the relays 51–56 and the actuators 33. Brake pressure that is above the "idle" brake pressure is considered to be an indication that the brakes 35 are actuated and that braking can be taking place. When this brake pressure is above the "idle" condition, data acquisition is performed, as indicated at block 156. This continues for a predetermined number of data acquisition cycles, indicated at block 157, in order that sufficient data is acquired to create a model of brake performance.

In the developmental embodiment, computer routines were written in National Instruments LabVIEW 3.1 for Microsoft Windows, a graphical programming language for instrumentation and data analysis. Seven channels of data (all pressure, force, speed, and acceleration transducers) were recorded on an Optim Electronics Megadac 6506S digital data acquisition system. The Megadac was connected via an IEEE 488 General Purpose Interface Bus (GPIB) to an IBM PC 486 laptop computer running National Instruments LabVIEW software. Data were initially collected on optical media in the Megadac and then transferred across the GPIB to the laptop.

Tests used the Megadac primarily as a data gathering and signal conditioning device. Data from tests were momentarily stored in the volatile memory of the Megadac during braking maneuvers, then rapidly downloaded across the GPIB to the hard disk of the computer via LabVIEW code. Once on the computer, data were analyzed in LabVIEW, allowing immediate assessment of brake effectiveness.

A tractor-semitrailer consisting of a semi-truck and flatbed trailer vehicle combination was used. The truck was fitted with electronic instrumentation that was continuously monitored and recorded. The vehicle had five axles arranged with two pair of tandem axles, plus the steering axle. The monitored and recorded data described the following functions:

treadle valve (brake application) air pressure;
vehicle speed;
vehicle deceleration;
brake response pressure at each major axle group (three total);
temperature at four brakes (left and right brake on axles three and five);
vehicle speed; and
vehicle weight A 20 g single axis accelerometer was aligned with and rigidly mounted to the inboard side of the main right frame member of the tractor, just aft of the cab. Vehicle deceleration was also determined through differentiation of fifth wheel velocity versus time information. Type J thermocouples were installed in the trailing (top) shoes of both brakes on axles 3 and 5 (four total).

No attempt was made to monitor the brakes on the steering axle in the developmental embodiment. It is anticipated that the preferred production embodiment will provide at least some monitoring of brakes on the steering axle.

The test was performed on a test track and allowed a driver application of brake pressure to all wheels. A pressure transducer was installed in the output air line to monitor brake application pressure. Pressure transducers were also installed at tees in the air lines entering the actuator chambers for the right side brakes on axles one, three, and five.

Several data analysis steps were left as manual operations to provide the flexibility to experiment with different techniques. The resulting need to briefly review graphical data and input several computer commands after each braking maneuver meant that on-screen information (or warning) about brake effectiveness was delayed 20 or 30 seconds. In the preferred production manifestation of the invention, all operations handled by the LabVIEW code would be automated and programmed into a dedicated microprocessor, allowing instantaneous readings on brake performance.

In the developmental embodiment, several LabVIEW routines were written. One routine enabled the data to be downloaded to a PC upon completion of each braking maneuver. In practice, this could be done immediately following release of the treadle valve, or for a group of tests, at the end of a series of brake applications. As a result, during the training cycles, no data would have to be post-processed until all the training data had been collected, so data downloading would need to occur only once, at the end of the training cycle.

In the developmental embodiment, vehicle weight was a user-defined entry. In the preferred production embodiment, vehicle weight will be determined on-board, through any of several possible means, including on-board weight sensors. This determination will allow the invention to be implemented within a totally passive device, and none of the inputs currently required of the user will be necessary.

After the training sequence had been completed, a pattern for acceptable braking was established from the data and three multiple linear regression models of the data were established. In the first model, braking force was a dependent variable, thereby allowing a predictive equation for deceleration to be determined. The other two models defined predictive equations for lag and decay constants for response pressures at the tractor and trailer tandem axle locations, respectively, which indicate brake adjustment condition. The models represent baseline conditions for "good" brakes for the particular vehicle configuration.

After predictive model coefficients had been determined, vehicle brakes could be monitored. If any of the predicted values differed by more than a predetermined acceptable tolerance, a red warning light appeared on a test display screen.

Confirmatory test results also revealed that several additional factors showed promise for indicating brake degradation, including temporal variations in application pressure and acceleration, and the use of brake response pressure delay time as a model response variable.

In addition to the statistical analysis that formed the basis of the predictive model, considerable effort was expended to compare actual (degraded) brake performance with predicted performance. This analysis formed the foundation for the diagnostic capability; "bad" brakes must be distinct from the prediction of "good" brakes for a given set of conditions, and the distinction must be made before brakes are dangerously degraded.

The use of such lab equipment for data gathering and analysis, while interesting, is cumbersome and expensive. It is anticipated that in the production embodiments of the invention, data collection and analysis functions will be performed by special a purpose computer with code stored on ROM. In addition, it is anticipated that other calculated external inputs will be used where available.

Once the predetermined number of data acquisition cycles have been performed (block 157), a brake regression model is established, as indicated at block 159. The data acquired in the training mode (blocks 156 and 157) is used as a baseline for indicating brake performance when the brakes 35 are in a roadworthy condition.

In the operational mode shown below in line 151, dynamic braking is performed in a manner similar to the training mode (blocks 154–157). Data comparison is initiated when brake pressure is at a predetermined "idle" pneumatic pressure, as indicated at block 163. The predetermined "idle" pressure in the operational mode may or may not be the same as the "idle" pressure used in the training mode. In response to brake pressure above "idle," data is acquired, as indicated at block 165. This data is compared with the model determined in the regression modeling step (block 159). This comparison is indicated at block 167. If the comparison (block 167) establishes that the brake condition is beyond a predetermined upper threshold, as shown at block 169, a warning is provided.

To avoid false alarms, the upper threshold (decision block 169) must be sufficiently high that most ambiguous deviations from the model (block 167) do not immediately manifest as an indication or warning of brake degradation. This contradicts the possibility that many brake failure modes are the result of marginal deviations from the model (block 167). In order to accommodate the possibility that a brake failure mode may be indicated by a slight deviation from the model (block 167), a plurality of samplings is taken on a FIFO basis, as indicated by block 171. This allows an average or weighted average of a predetermined number of sequences (block 163) to be compared with the model (block 167). If the average is beyond a predetermined threshold, as indicated at block 173, a warning is issued, as indicated at block 149. Thus, a clear excess of deviation, indicated at block 169, provides a brake warning, while a lesser deviation over a period of time, as indicated at block 173, each provide warnings, as indicated at block 149.

The static mode testing 145, 147 can be extended to occur on an ongoing basis. This can be accomplished by determining the occurrence of the event, as indicated at block 181. Such an event can be, for example, the operation of a parking brake, or any other regularly-occurring event. This could be the "start engine" event 141. There are, however, cases in which the engine may be left running until significant maintenance is performed on the truck, so that an alternative event may have to be chosen. In addition, a manual request may be offered, as indicated at block 183. A determination is then made as to whether the vehicle is moving, block 185, and the brakes 35 are snubbed if lack of vehicle movement permits, block 187. Brake lag or brake decay is then measured, as indicated at block 189. If the time delay for the measured lag or decay exceeds a predetermined threshold, as indicated at block 147a, a warning is provided, block 149.

It is therefore anticipated that a static test routine may be performed during road operation of the vehicle. The distinction is that static mode testing may successfully be performed with the vehicle stationary and does not depend on dynamic forces such as vehicle deceleration.

It is also possible to use the extended static mode test in order to determine whether the brakes 35 are within adjustment limits while the vehicle is moving. In such a case, a determination that the vehicle is moving, block 185, is made, and the test continues, as indicated by dashed line 191. It is, of course, possible to describe the brake lag or brake decay test in the data acquisition mode, indicated at block 165. This would be the same situation as described in connection with block 181, wherein the determining event includes the brake line pressure being above a predetermined limit, as described with block 163.

It is therefore anticipated that in the preferred embodiment, decay will be used to measure brake performance while the vehicle is moving. In such an embodiment, decay will be measured and compared with a model of ideal decay during every application of the brakes. Though lag is a similar indication of brake performance, it was found to be more difficult to measure while the truck is in operation, and so lag measurement may best be done while stationary.

It is noted that in each of the sequences, it is not necessary for the driver to physically exit the vehicle in order to assess the condition of the brakes 35. Visual inspection may nonetheless be performed, and it is expected that such manual brake inspection will be accomplished in response to an appropriate warning or indication (block 149). The warning may be a single indication, such as a brake warning light switching on in a trip-free manner so that the brake warning indication remains on until manually reset. It is possible that the brake warning 149 may be issued only during receipt of a warning signal, so that the driver may observe different types of warnings, such as a warning provided from a single beyond-threshold event as indicated at block 169 or a warning from an average number of events beyond a lower threshold, as indicated at block 173. It is possible to provide a display to indicate the nature of the initiating event. In addition, it is also possible to provide a record of the warning, as indicated at block 195, so that appropriate trouble shooting and repair can be effected.

It is anticipated that the model may be developed as a fixed criteria for all vehicles of a particular type. If that is the case, the need to establish a training mode for each vehicle would be eliminated, although it is possible that the fixed criteria model may be established in such a training mode.

It is anticipated that the warning may not necessarily be provided to the driver. There are conditions which require attention during routine maintenance which may not require any driver action in response to the sensing of such a condition. Therefore, an indication of a brake condition may be provided which is not of the nature of a warning. Such indications may, for example, be stored for later retrieval during servicing.

While articulated vehicles using semi-trailers and dollies have been described, the present invention can be used in a wide variety of articulated and non-articulated vehicles. For example, it is anticipated that truck vehicles may use an articulated platform in which joined units are connected at axle groups and multiple units share the same axle group. This is common with passenger buses and in some countries, including Canada. It is also anticipated that the invention can be used where data is obtained solely within a single unit such as the tractor 13.

Furthermore, this invention has been described above with reference to pneumatically operated brakes. The invention can also be applied in braking systems using other operating means or combinations of means, including, but not limited to pneumatic, hydraulic, mechanical, or electrical actuation. Accordingly, the invention should be read only as limited by the claims.

What is claimed is:

1. A method of monitoring a vehicle's braking system and providing an indication of brake condition, comprising:

creating a performance model for brake performance;

acquiring data indicative of actual brake performance in response to actuation of the brakes;

comparing the data with the model;

if the comparison with the model exceeds a threshold, providing an indication; and creating the performance model to estimate the vehicle's braking effect as a function of brake response delay.

2. The method of claim 1, including:

determining an actual brake response delay during vehicle operation; and comparing the estimated brake response delay with the determined brake response delay to determine brake degradation; if the comparison of the actual brake response delay is on one side of a threshold, providing an indication.

3. The method of claim 1, wherein the step of creating a performance model includes creating an algorithm that estimates the vehicle's brake response delay at a point in a brake line between a supply reservoir and a brake actuator chamber based on a given applied brake control signal;

determining the brake control signal;

determining a brake response delay between application of the brake control signal and brake application pressure; and comparing the measured brake response delay of the previous step with the estimated brake response delay to determine brake degradation.

4. The method of claim 1, wherein the step of creating the model includes:

operating the vehicle when its brakes are in a cool, well-maintained condition by varying the brake control signal;

compiling brake response time data as the brake control signal is varied; and estimating the functional relationship between the brake response time and the change in the brake control signal.

5. The method of claim 4, wherein the step of estimating the functional relationship between the brake response time and the change in the brake control signal includes creating a mathematical model to fit the braking effect data.

6. The method of claim 4, wherein:

the brake control signal is air pressure controlled by a brake treadle valve; and the step of compiling brake pressure response time data includes determining the time it takes for the brake pressure at the brake chamber to reach a predetermined percentage change in the applied brake pressure.

7. The method of claim 2, wherein:

the brake control signal is air pressure controlled by a brake treadle valve; and wherein the step of determining an actual brake response delay comprises determining the rate of pressure build-up and decay at the brake chamber in response to a change in the applied brake treadle pressure.

8. A method of monitoring a vehicle's braking system for the purpose of determining brake degradation, the method comprising the steps of:

creating a model of the vehicle's braking effect as a function of brake response delay;

determining an actual brake response delay during vehicle operation; and comparing the model brake response delay with the determined brake response delay to determine brake degradation.

9. The method of claim 8, wherein the step of creating said model includes determining braking deceleration based on a given vehicle speed and a given brake control signal; and said method further comprising:

the step of determining the vehicle's speed during operation of the vehicle.

10. The method of claim 8, wherein the step of creating said model includes estimating braking deceleration based on a given vehicle speed and a given brake control signal; and said method further comprising:

determining a value corresponding to vehicle weight during operation of the vehicle.

* * * * *